US012392183B2

(12) United States Patent
Anderson et al.

(10) Patent No.: US 12,392,183 B2
(45) Date of Patent: Aug. 19, 2025

(54) INERTIAL LOCK FRICTION HINGE

(71) Applicant: Reell Precision Manufacturing Corporation, St. Paul, MN (US)

(72) Inventors: Benjamin Anderson, Scandia, MN (US); George Larson, Roseville, MN (US); Horace Beale, Bayport, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 5 days.

(21) Appl. No.: 18/036,082

(22) PCT Filed: Nov. 11, 2021

(86) PCT No.: PCT/US2021/059023
§ 371 (c)(1),
(2) Date: May 9, 2023

(87) PCT Pub. No.: WO2022/103989
PCT Pub. Date: May 19, 2022

(65) Prior Publication Data

US 2024/0018815 A1 Jan. 18, 2024

Related U.S. Application Data

(60) Provisional application No. 63/112,366, filed on Nov. 11, 2020.

(51) Int. Cl.
*E05D 11/08* (2006.01)

(52) U.S. Cl.
CPC .................................. *E05D 11/082* (2013.01)

(58) Field of Classification Search
CPC ... E05D 11/082; E05D 11/1007; E05B 77/06; E05B 83/28; E05B 77/12; E05Y 2201/22; E05Y 2201/244; B60R 7/08
See application file for complete search history.

(56) References Cited

U.S. PATENT DOCUMENTS 2,999,268 A * 9/1961 Strandengen ........... E05D 7/086 188/67
3,917,188 A 11/1975 Nilsson
(Continued)

FOREIGN PATENT DOCUMENTS

DE 4130847 C2 * 4/1995 ............. E05B 77/06
DE 10 2009 041 514 A1 3/2011
(Continued)

OTHER PUBLICATIONS

International Search Report and Written Opinion in PCT/US2021/059023 dated Mar. 3, 2022.

*Primary Examiner* — Jason W San
*Assistant Examiner* — Matthew J Sullivan
(74) *Attorney, Agent, or Firm* — Dicke, Billig & Czaja, PLLC

(57) ABSTRACT

One aspect is an inertial lock friction hinge, including a shaft assembly having a shaft assembly recess and a friction assembly having a friction assembly recess. The shaft assembly and the friction assembly are rotatably coupled for relative frictional rotation. The hinge includes a restraining component positioned within the hinge such that when the hinge is in an unlocked condition the restraining component is not engaged with both the friction assembly recess and the shaft assembly recess so that the shaft assembly and the friction assembly are allowed to rotate relative to each. The restraining component is positioned such that when the inertial lock friction hinge is in a locked condition the restraining component is at least partially engaged with both the friction assembly recess and the shaft assembly recess so that the shaft assembly and the friction assembly are locked and prevented from relative rotation by the restraining component.

20 Claims, 28 Drawing Sheets

(56) References Cited

U.S. PATENT DOCUMENTS

| | | | | |
|---|---|---|---|---|
| 4,610,480 | A * | 9/1986 | Yamada | B60R 22/40 242/379.2 |
| 5,476,307 | A | 12/1995 | Whalen | |
| 5,598,607 | A * | 2/1997 | Katagiri | E05D 11/084 16/337 |
| 5,603,540 | A * | 2/1997 | Shibao | E05B 77/06 292/341.15 |
| 5,918,347 | A * | 7/1999 | Morawetz | E05D 11/1071 16/322 |
| 6,471,262 | B1 * | 10/2002 | Schwab | E05B 77/06 292/351 |
| 6,473,938 | B1 * | 11/2002 | Yoshigashima | G06F 1/1616 16/386 |
| 6,584,646 | B2 * | 7/2003 | Fujita | G06F 1/1681 16/342 |
| 6,609,273 | B1 * | 8/2003 | Yamada | F16C 11/02 16/386 |
| 6,886,222 | B2 | 5/2005 | Vitry | |
| 7,185,952 | B1 * | 3/2007 | Chen | B60N 2/28 297/411.38 |
| 7,478,848 | B2 * | 1/2009 | Kim | E05B 85/18 292/336.3 |
| 7,845,701 | B2 * | 12/2010 | Muller | E05B 83/32 296/37.13 |
| 8,096,020 | B2 * | 1/2012 | Tang | G06F 1/1616 16/337 |
| 8,387,812 | B2 * | 3/2013 | Delage | A45D 42/00 206/581 |
| 8,418,319 | B2 * | 4/2013 | Nagami | B60R 11/0235 16/337 |
| 8,662,582 | B2 | 3/2014 | Hall et al. | |
| 9,127,876 | B2 * | 9/2015 | Wilson | F25D 23/02 |
| 9,308,843 | B2 * | 4/2016 | Pichler-Wilhelm | B60N 2/43 |
| 9,388,617 | B2 * | 7/2016 | Onda | E05D 11/082 |
| 9,689,184 | B2 * | 6/2017 | Kang | E05B 77/06 |
| 9,714,530 | B2 * | 7/2017 | Amick | E05B 77/12 |
| 10,405,677 | B2 * | 9/2019 | Cummings | A47F 10/06 |
| 11,353,931 | B2 * | 6/2022 | Hsu | E05D 1/04 |
| 11,507,145 | B2 * | 11/2022 | Nakamura | E05F 1/1207 |
| 11,578,515 | B2 * | 2/2023 | Hodgson | E05C 3/12 |
| 11,598,365 | B2 * | 3/2023 | Lin | F16C 11/04 |
| 11,693,455 | B2 * | 7/2023 | Lee | H04M 1/0216 16/331 |
| 11,747,866 | B2 * | 9/2023 | Wang | G06F 1/1681 16/337 |
| 11,789,500 | B2 * | 10/2023 | Yang | E05D 3/122 16/223 |
| 11,828,091 | B2 * | 11/2023 | Han | E05B 77/06 |
| 2003/0024073 | A1 * | 2/2003 | Chih | G06F 1/1601 16/326 |
| 2005/0188504 | A1 * | 9/2005 | Duan | H04M 1/0216 16/330 |
| 2007/0094845 | A1 * | 5/2007 | Chang | G06F 1/1616 16/342 |
| 2009/0038225 | A1 | 2/2009 | Suh | |
| 2018/0266149 | A1 * | 9/2018 | Giddings | B60R 7/08 |
| 2018/0274274 | A1 * | 9/2018 | Naganuma | E05D 11/1028 |
| 2020/0003253 | A1 * | 1/2020 | Ng | F16C 11/045 |
| 2020/0331416 | A1 | 10/2020 | O'Connor et al. | |
| 2021/0180369 | A1 * | 6/2021 | Nayak | E05B 17/2057 |
| 2023/0020916 | A1 * | 1/2023 | Kwon | E05B 77/12 |

FOREIGN PATENT DOCUMENTS

| | | |
|---|---|---|
| DE | 10 2010 028 673 B4 | 11/2011 |
| DE | 10 2017 123 410 A1 | 4/2019 |
| WO | 2017/051673 | 3/2017 |

* cited by examiner

INERTIAL LOCK FRICTION HINGE

BACKGROUND

Friction hinges are commonly used for many applications and come in many varieties throughout industry. One specific application is in automotive applications for compartment closures. When friction is added within the hinge for center consoles and other compartments, users get a solid feel and can count on the lid staying open until manually moved closed. A friction hinge alone will not keep the bin from opening under certain loading conditions. For this reason, it is known to use a latch or an inertial lock to keep lids closed, particularly in automotive compartment to meet safety standards. Inertial locks are used in situations where there is a desire to not have the user operate a latch each time the compartment is opened. In latch-less compartment designs, an inertial lock is typically used in place of the latch to meet safety standards. These function to prevent the movement of a compartment lid only when exposed to certain impact loads. These inertial locks, however, have drawbacks including cosmetic disadvantages, large package size, need for reset after device engagement, time required to engage and also can require complicated assembly.

Accordingly there is a need for a compact design that provides both frictional torque and an inertial locking function in order to meet cost and cosmetic expectations of these applications. It is also important to provide these features in a design that limits rotation angle of the moving portion of the system due to inertial forces.

SUMMARY

One embodiment is an inertial lock friction hinge system including a first hinged element, a second hinged element, a shaft assembly coupled to the first hinged element, the shaft assembly having a shaft assembly recess, and a friction assembly coupled to the second hinged element, the friction assembly having a friction assembly recess. The shaft assembly and the friction assembly are rotatably coupled for relative frictional rotation. A restraining component is positioned within the inertial lock friction hinge such that when the restraining component is fully contained within one of the friction assembly recess and the shaft assembly recess the shaft assembly and the friction assembly are allowed to rotate relative to each other under friction such that the inertial lock friction hinge system is in an unlocked condition. The restraining component is further positioned such that when the restraining component is at least partially within both of the friction assembly recess and the shaft assembly recess the shaft assembly and the friction assembly are prevented from relative rotation such that the inertial lock friction hinge system is in a locked condition.

One embodiment is the inertial lock friction hinge system of any previous embodiment, wherein the inertial lock friction hinge system is configured to be in the unlocked condition when gravitational force acts upon the inertial lock friction hinge and configured to be in the locked condition when an external impact force acts upon the inertial lock friction hinge.

One embodiment is the inertial lock friction hinge system of any previous embodiment, wherein the inertial lock friction hinge system is configured such that gravitational force acting on the inertial lock friction hinge system causes the restraining component to be fully contained within one of the friction assembly recess and the shaft assembly recess so that the inertial lock friction hinge system is in the unlocked condition.

One embodiment is the inertial lock friction hinge system of any previous embodiment, wherein the inertial lock friction hinge system is configured such that an external impact force acting on the inertial lock friction hinge system causes the restraining component to be partially contained within each of the friction assembly recess and the shaft assembly recess so that the inertial lock friction hinge system is in the locked condition.

One embodiment is the inertial lock friction hinge system of any previous embodiment, wherein the shaft assembly comprises a shaft housing and a shaft and the friction assembly comprises a friction housing containing at least one friction element, and wherein the at least one friction element is configured over the shaft in an interference fit.

One embodiment is the inertial lock friction hinge system of any previous embodiment, wherein the shaft rotates along a shaft axis and wherein when the inertial lock friction hinge system changes between the locked condition and the unlocked condition the restraining component moves radially relative to the shaft.

One embodiment is the inertial lock friction hinge system of any previous embodiment, wherein the restraining component is one of a pin and a rectangular block.

One embodiment is the inertial lock friction hinge system of any previous embodiment, wherein the restraining component further comprises a bias mechanism configured to hold the restraining component in one of the friction assembly recess and the shaft assembly recess until an impact force causes a load on the bias mechanism thereby moving the restraining component at least partially into both of the friction assembly recess and the shaft assembly recess.

One embodiment is an inertial lock friction hinge including a shaft assembly having a shaft assembly recess and a friction assembly having a friction assembly recess. The shaft assembly and the friction assembly are rotatably coupled for relative frictional rotation. A restraining component is positioned within the inertial lock friction hinge such that when the inertial lock friction hinge is in an unlocked condition the restraining component is not engaged with both the friction assembly recess and the shaft assembly recess so that the shaft assembly and the friction assembly are allowed to rotate relative to each other under friction. The restraining component is further positioned such that when the inertial lock friction hinge is in a locked condition the restraining component is at least partially engaged with both the friction assembly recess and the shaft assembly recess so that the shaft assembly and the friction assembly are locked and prevented from relative rotation by the restraining component.

One embodiment is the inertial lock friction hinge system or the inertial lock friction hinge of any previous embodiment, wherein the inertial lock friction hinge is configured to be in the unlocked condition when gravitational force acts upon the inertial lock friction hinge and configured to be in the locked condition when an external impact force act upon the inertial lock friction hinge.

One embodiment is the inertial lock friction hinge system or the inertial lock friction hinge of any previous embodiment, wherein the inertial lock friction hinge is configured such that an external impact force acting on the inertial lock friction hinge causes the restraining component to be partially engaged with each of the friction assembly recess and the shaft assembly recess so that the inertial lock friction hinge is in the locked condition.

One embodiment is the inertial lock friction hinge system or the inertial lock friction hinge of any previous embodiment, wherein the shaft assembly comprises a shaft housing and a shaft and the friction assembly comprises a friction housing containing at least one friction element, and wherein the at least one friction element is configured over the shaft in an interference fit.

One embodiment is the inertial lock friction hinge system or the inertial lock friction hinge of any previous embodiment, wherein the shaft rotates along a shaft axis and wherein when the inertial lock friction hinge system changes between the locked condition and the unlocked condition the restraining component moves radially relative to the shaft.

One embodiment is the inertial lock friction hinge system or the inertial lock friction hinge of any previous embodiment, wherein the restraining component transitions radially toward the shaft with application of impact force to the inertial lock friction hinge.

One embodiment is the inertial lock friction hinge system or the inertial lock friction hinge of any previous embodiment, wherein the restraining component is one of a pin, a rectangular block and a pawl.

One embodiment is an inertial lock friction hinge including a shaft assembly having a shaft assembly recess and a friction assembly having a friction assembly recess. The shaft assembly and the friction assembly are rotatably coupled for relative frictional rotation. A restraining component is positioned within the inertial lock friction hinge such that when the inertial lock friction hinge is in an unlocked condition the restraining component is fully contained within one of the friction assembly recess and the shaft assembly recess so that the shaft assembly and the friction assembly are allowed to rotate relative to each other under friction. The restraining component is further positioned such that when the inertial lock friction hinge is in a locked condition the restraining component is at least partially contained within both the friction assembly recess and the shaft assembly recess so that the shaft assembly and the friction assembly are locked and prevented from relative rotation by the restraining component.

One embodiment is the inertial lock friction hinge system or the inertial lock friction hinge of any previous embodiment, wherein the inertial lock friction hinge system is configured to either change from the locked condition to the unlocked condition or change from the unlocked condition to the locked condition when an external impact force acts upon the inertial lock friction hinge.

One embodiment is the inertial lock friction hinge system or the inertial lock friction hinge of any previous embodiment, wherein the external impact force on the inertial lock friction hinge system either causes the restraining component to be fully contained within one of the friction assembly recess and the shaft assembly recess so that the inertial lock friction hinge system is in the unlocked condition or causes the restraining component to be partially contained within each of the friction assembly recess and the shaft assembly recess so that the inertial lock friction hinge system is in the locked condition.

One embodiment is the inertial lock friction hinge system or the inertial lock friction hinge of any previous embodiment, wherein the shaft assembly comprises a shaft housing and a shaft and the friction assembly comprises a friction housing containing at least one friction element, and wherein the at least one friction element is configured over the shaft in an interference fit.

One embodiment is the inertial lock friction hinge system or the inertial lock friction hinge of any previous embodiment, wherein the shaft rotates along a shaft axis and wherein when the inertial lock friction hinge system changes between the locked condition and the unlocked condition the restraining component moves radially relative to the shaft.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the invention. The following detailed description, therefore, is not to be taken in a limiting sense, and the scope of the invention is defined by the appended claims.

It is to be understood that the features of the various exemplary embodiments described herein may be combined with each other, unless specifically noted otherwise.

Figure 1:
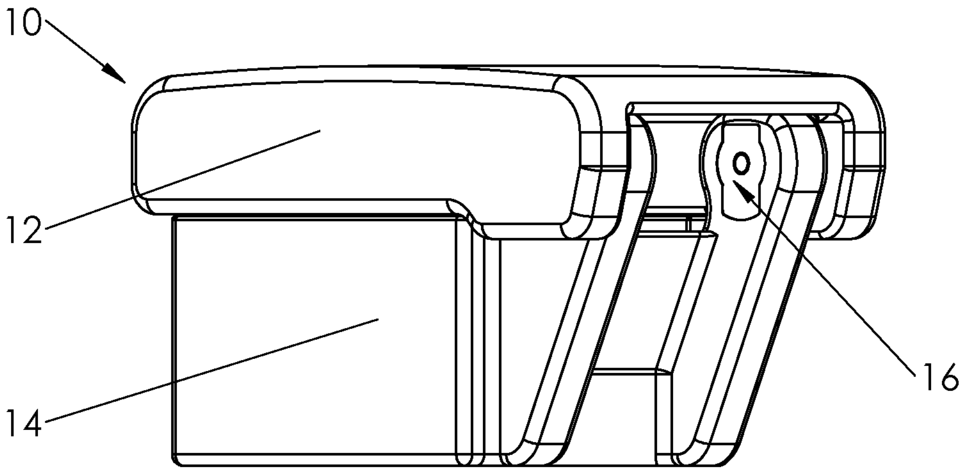
FIG. 1 illustrates a perspective view of a hinged system incorporating an inertial lock friction hinge in accordance with one embodiment.
Figure 2:
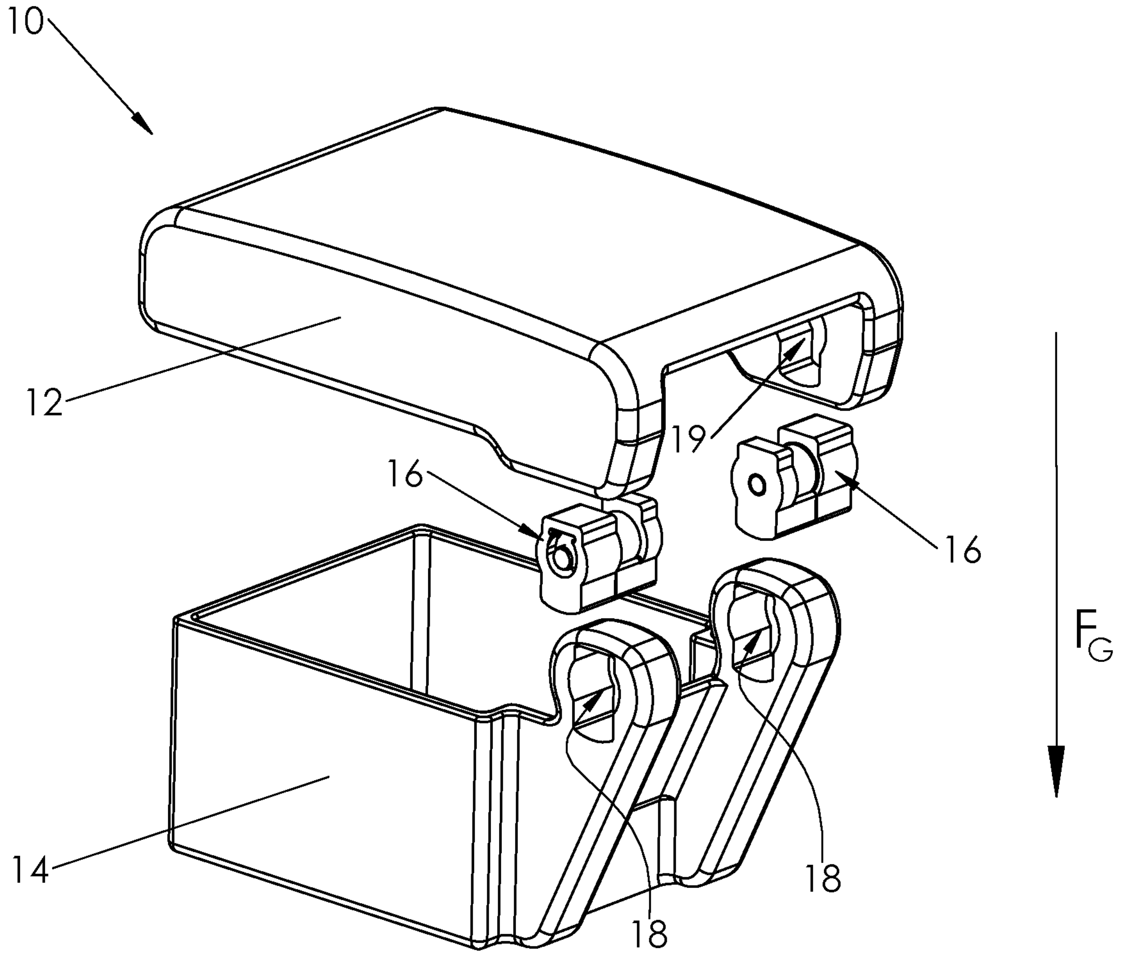
FIG. 2 illustrates an exploded view of the hinged system of FIG. 1 incorporating an inertial lock friction hinge in accordance with one embodiment.
Figure 3:
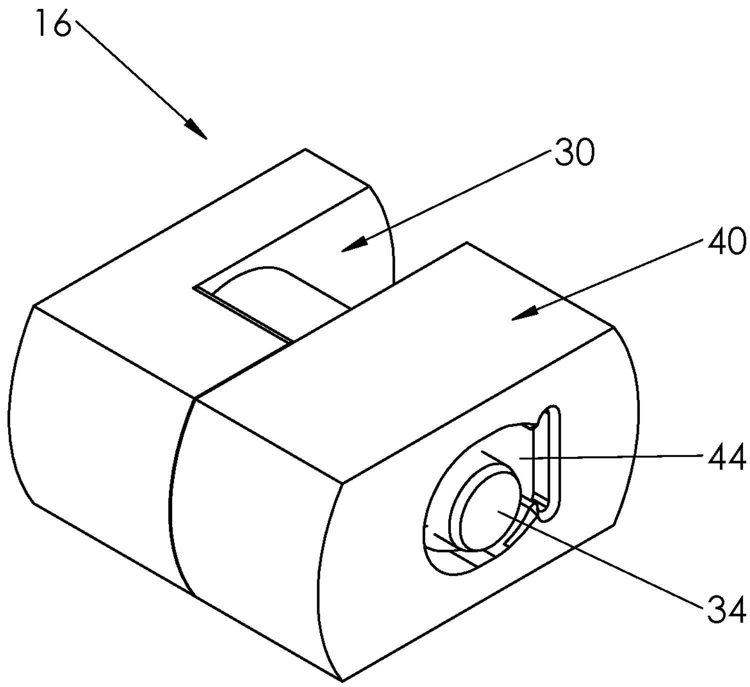
FIG. 3 illustrates a perspective view of an inertial lock friction hinge in accordance with one embodiment.

FIG. 1 illustrates a hinged system 10 incorporating an inertial lock friction hinge 16 in accordance with one embodiment. FIG. 2 further illustrates an exploded view of hinged system 10, illustrating further components not visible in FIG. 1. In one embodiment, hinged system 10 includes a base 14 and a top 12. In one embodiment, base 14 includes openings 18 and top 12 includes openings 19, which are respectively configured to house or contain portions of inertial lock friction hinge 16. In this way, top 12 is frictionally hinged relative to base 14 with inertial lock friction hinge 16. In the illustrated embodiment, two inertial lock friction hinges 16 are illustrated, but in some embodiments one may be used, while in others more than two are used.

In one embodiment, hinged system 10 is a console, such as a console located between front seats in an automobile. Friction torque within inertial lock friction hinge 16 holds top 12 closed on base 14. In this way, hinged system 10 does not require a separate latch to hold top 12 closed. A user can open top 12 by simply applying a force greater than the friction torque within inertial lock friction hinge 16. This allows for simple one-hand operation, and friction at the hinge location allows for efficient packaging when space is consumed at the back corner of the compartment.

Furthermore, inertial lock friction hinge 16 holds lid 12 completely closed and locked in place in a situation where an inertial force within inertial lock friction hinge 16 is exceeded, such as when the automobile within which hinged system 10 is mounted experiences an external dynamic force, such as an impact that normally would cause the lid to open. This ensures that lid 12 is prevented from significantly rotating away from base 14 such that any contents therein cannot project out into the automobile in case of impact or collision. Inertial lock friction hinge 16 may also be similarly implemented in applications other than automobiles.

In one embodiment, when hinge system 10 is oriented as illustrated in FIGS. 1 and 2, a gravitational force $F_G$ acts down in the direction of arrow $F_G$. In this orientation, a gravitational force acting upon inertial lock friction hinge 16 maintains inertial lock friction hinge 16 in an unlocked condition. In this way, a user can open and close lid 12 relative to base 14 by overcoming the frictional torque or force of inertial lock friction hinge 16. When hinge system 10 is subjected to a dynamic or impact force, however, the inertial force caused by the impact with a component that is in the same direction as gravitational force $F_G$ overcomes the gravitational force $F_G$ such that inertial lock friction hinge 16 is in a locked condition. In this way, the lid 12 cannot be opened or moved relative to base 14 regardless of the force applied to lid 12.

FIGS. 3-7 illustrate inertial lock friction hinge 16 in accordance with one embodiment. In one embodiment, inertial lock friction hinge 16 includes shaft assembly 30, friction assembly 40 and restraining component 50. In one embodiment, a first hinged element 12 is coupled to friction assembly 40 and second hinged element 14 is coupled to shaft assembly 30. As first hinged element 12 and friction assembly 40 are rotated relative to second hinged element 14 and shaft assembly 30, friction torque due to inertial lock friction hinge 16 is produced, as will be explained further below. In one embodiment, for example when added to a console or other compartment, a user experiences a solid feel and can count on the hinged element 12, such as a lid, staying open until manually moved closed and staying closed until manually moved open. This allows for simple one-hand operation. Also, inertial lock friction hinge 16 allows the elimination of latch and catch components.

In one embodiment, shaft assembly 30 includes shaft housing 32 and shaft 34. In one embodiment, shaft housing 32 further includes shaft housing opening 33 and shaft assembly recess 54. In one embodiment, friction assembly 40 includes a plurality of friction elements 44 and friction housing 42. In one embodiment, friction housing 42 includes friction assembly recess 52.

In one embodiment, when inertial lock friction hinge 16 is assembled, shaft 34 is firmly attached within shaft housing opening 33. In one embodiment, shaft 34 has a knurled end that is forced into shaft housing opening 33 such that they are fixed together. Shaft 34 is configured to rotate about its axis X, and shaft 34 and shaft housing 32 rotate together by virtue of being fixed together.

Friction elements 44 are placed over shaft 34 in an interference fit and are also contained within friction housing 42. In one embodiment, grease is placed between the friction elements 44 and shaft 34. In one embodiment, friction housing 42 has a friction housing opening 43 with a profile that matches a portion of the outer profile of friction elements 44, such that friction elements 44 are prevented from relative rotation with friction housing 42. Accordingly, when shaft housing 32 rotates relative to friction housing 42, shaft 34 rotates within friction elements 44. Because of the interference fit between shaft 34 friction elements 44, their relative rotation produces friction torque within inertial lock friction hinge 16. The amount of friction torque within inertial lock friction hinge 16 can be readily adjusted up or down by respectively adding or subtracting the number of friction elements 44.

Figure 5:
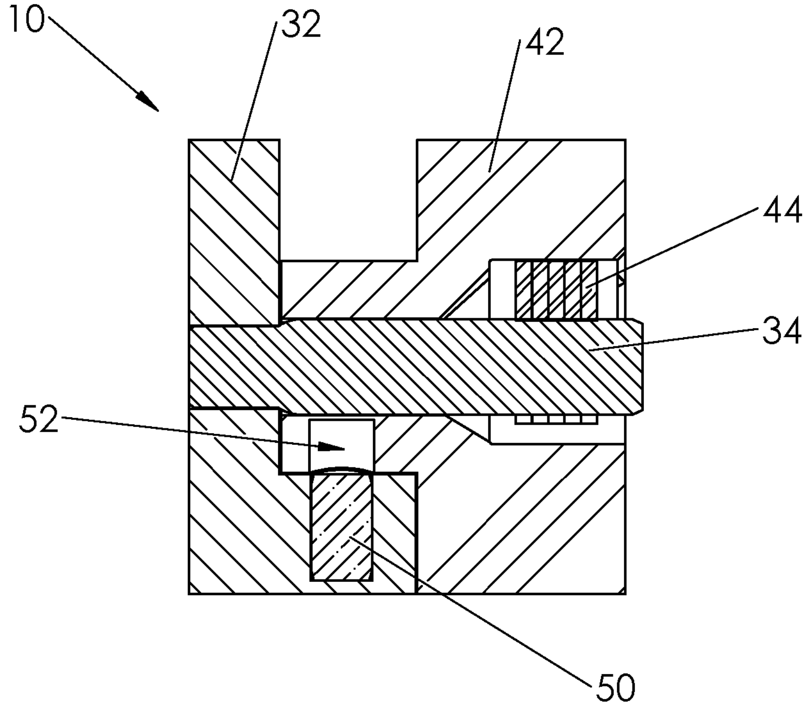
FIGS. 5-7 illustrate cross-sectional views of the inertial lock friction hinge in FIGS. 3-4 in accordance with one embodiment.

In at least one position of relative orientation of shaft housing 32 and friction housing 42, friction assembly recess 52 and shaft assembly recess 54 are aligned, for example, as illustrated in FIG. 5. In one embodiment, restraining component is located fully within shaft assembly recess 54, also as illustrated in FIG. 5. In this position, inertial lock friction hinge 16 is in an unlocked condition, such that shaft assembly 30, including shaft housing 32, and friction assembly 40, including friction housing 42, can be rotated relative to each other by applying a force greater than the friction torque of inertial lock friction hinge 16.

Figure 6:
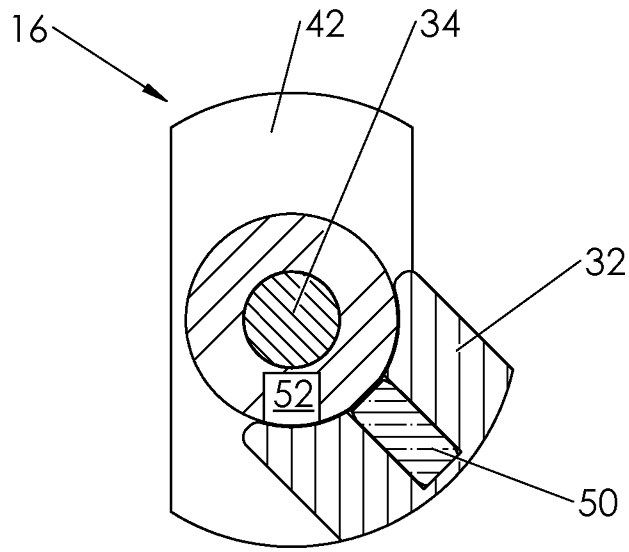

FIG. 6 illustrates how shaft housing 32 is rotated (counterclockwise as illustrated in the figure) relative to friction housing 42 as restraining component 50 remains fully within shaft assembly recess 54. During this rotation, of shaft housing 32 restraining component 50 is held in shaft assembly recess 54 by the outer diameter of friction housing 42. Accordingly, any acceleration and deceleration occurring during this orientation will not move restraining component 50. Only when friction assembly recess 52 and shaft assembly recess 54 are aligned will restraining component 50 move by gravity and/or the impact forces that cause engagement.

Figure 7:
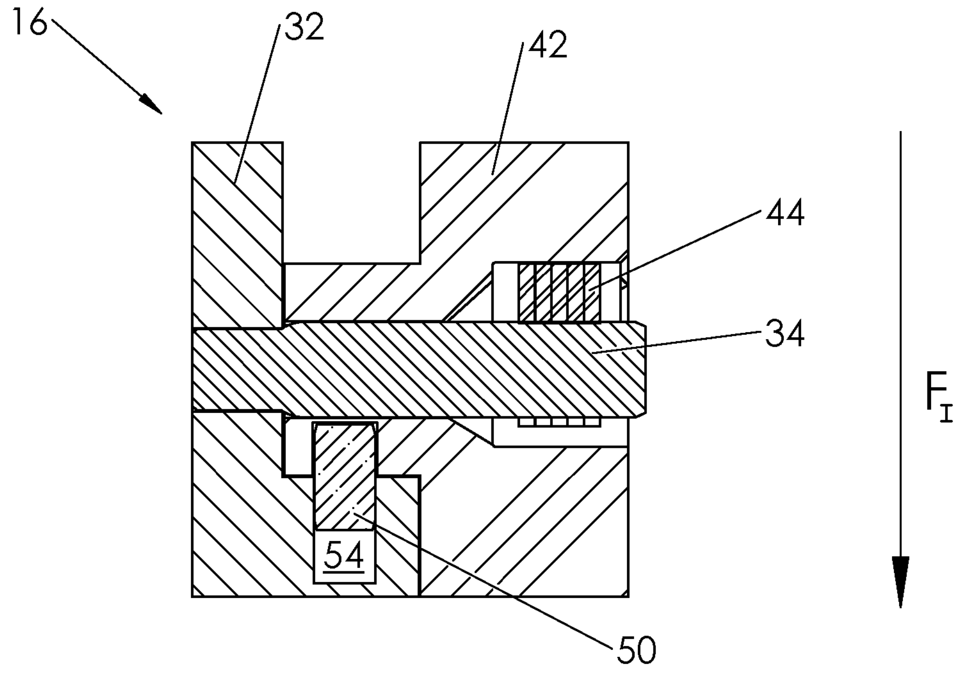

In one embodiment, subjecting inertial lock friction hinge 16 to an outside impact or dynamic force causes inertial lock friction hinge 16 to change from an unlocked condition to a locked condition. For example, when inertial lock friction hinge 16 is subjected to impact force $F_1$, as illustrated in FIG. 7, this causes restraining component 50 to shift partially out of shaft assembly recess 54 and at least partially into friction assembly recess 52 due to its inertial force, sometimes referred to as frictional force. Once this occurs, shaft housing 32 and friction housing 42 are prevented from significant relative rotation by restraining component 50. When restraining component 50 is oriented partially within shaft assembly recess 54 and partially within friction assembly recess 52, inertial lock friction hinge 16 is in a locked condition. When inertial lock friction hinge 16 is installed in a console, the cover 12 is then locked closed against base 14 and will retain any contents within base 14.

In one embodiment, when inertial lock friction hinge 16 is installed in hinge system 10, inertial lock friction hinge 16 is oriented such that gravitational force $F_G$ acts down causing restraining component 50 to remain within shaft assembly recess 54 (as illustrated in FIG. 5). When hinge system is subjected to a dynamic or impact force $F_1$ in the same direction as the gravitational force $F_G$, inertia of the blocker 50 causes it to want to stay in position relative to ground, while the rest of hinge 16 accelerates down according to the impact. In an application where hinge system 10 is mounted in an automobile, shaft assembly 30, friction assembly 40, first hinged element 12, and second hinged element 14 are all fixed to the automobile and will all accelerate with the impact force $F_1$ on the automobile. Since restraining component 50 is not fixed and free to move within shaft assembly recess 54 and friction assembly recess 52, however, its inertial force will cause it to move up (relative to how it is illustrated in FIG. 7), or radially toward shaft axis X.

In one embodiment, when dynamic or impact force $F_1$ dissipate, gravitational force $F_G$ will cause restraining component 50 to move radially away from shaft axis X and return within shaft assembly recess 54 (FIG. 5) so that inertial lock friction hinge 16 is again in the unlocked condition and the cover 12 is then movable relative to base 14. In one embodiment, the amount of impact force $F_1$ required to move restraining component 50 out of shaft assembly recess 54 into the locked position is about 2× the gravitational force $F_G$ holding it there, and applied in the same direction as gravitational force $F_G$.

In the embodiment illustrated in FIGS. 3-7, restraining component 50 is configured as a pin or generally cylindrical in shape. The corresponding shapes of friction assembly recess 52 and shaft assembly recess 54 are then configured to accommodate the shape of restraining component 50. Other configurations for restraining component 50 are possible, as will be illustrated.

Hinge system 10 with inertial lock friction hinge 16 includes an inertial locking mechanism directly within the components of a friction hinge mechanism. With both these mechanisms combined, the assembly of system 10 is simplified because both functions are combined into one system, thereby eliminating extra pieces of the known separate systems. Positioning the inertial locking features, including restraining component 50, near the axis X of rotation for shaft 34, in addition to providing friction at the axis, creates the advantage of allowing the inertial lock additional time to engage. Inertial lock friction hinge 16 has the challenge of dealing with high stresses due to directing the energy of the cover 12 to the pivot area. However, the structure of inertial lock friction hinge 16 and cover 12 can accommodate without much added mass. Several variations for creating a friction hinge, including friction disks and other friction torque technology, can be used in order to provide the same function.

In addition, because of both the friction torque and inertial effect of inertial lock friction hinge 16, neither a separate latch mechanism nor separate inertial lock mechanism, which are associated with prior systems, are needed. For example, with inertial lock friction hinge 16 installed in hinge system 10, no latch is needed to keep top 12 closed against base 14. As illustrated in FIGS. 1-2, when inertial lock friction hinge 16 is installed toward the back of hinged system 10, no latch is required at the front of hinged system 10, as would be required in some prior systems to ensure top 12 remains closed. This frees up valuable space, especially in applications where space is needed for other mechanisms.

Inertial lock friction hinge 16 illustrated in FIGS. 1-7 provides symmetrical function in either rotational direction. In applications that require multiple hinges due to high inertial forces or frictional requirements, one design could be used for all hinges. Other inertial lock designs can require a left and right pair. Inertial lock friction hinge 16 illustrated in FIGS. 1-7 can be used with either the shaft assembly or the friction assembly 40 attached to the rotating system component (top 12 in FIG. 1).

Figure 8:
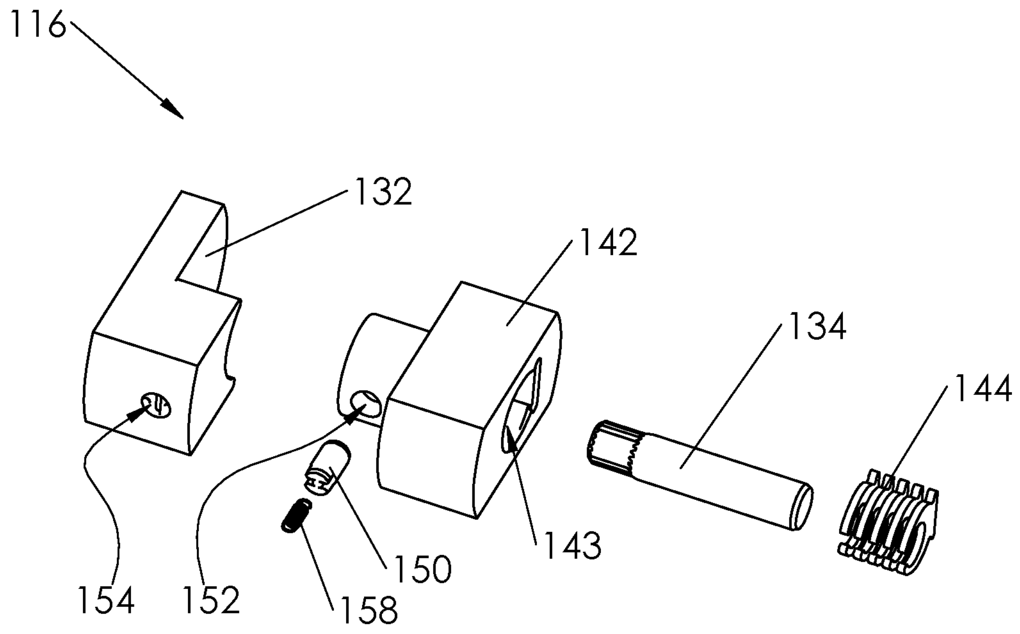
FIG. 8 illustrates an exploded view of an inertial lock friction hinge in accordance with one embodiment.
Figure 9:
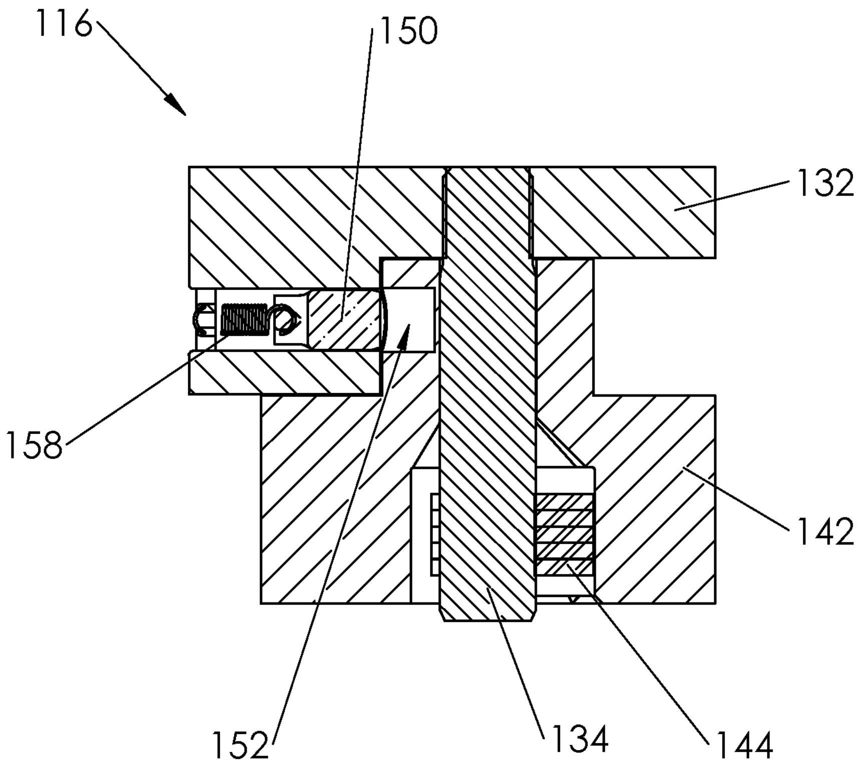
FIGS. 9-10 illustrate cross-sectional views of the inertial lock friction hinge in FIG. 8 in accordance with one embodiment.
Figure 10:
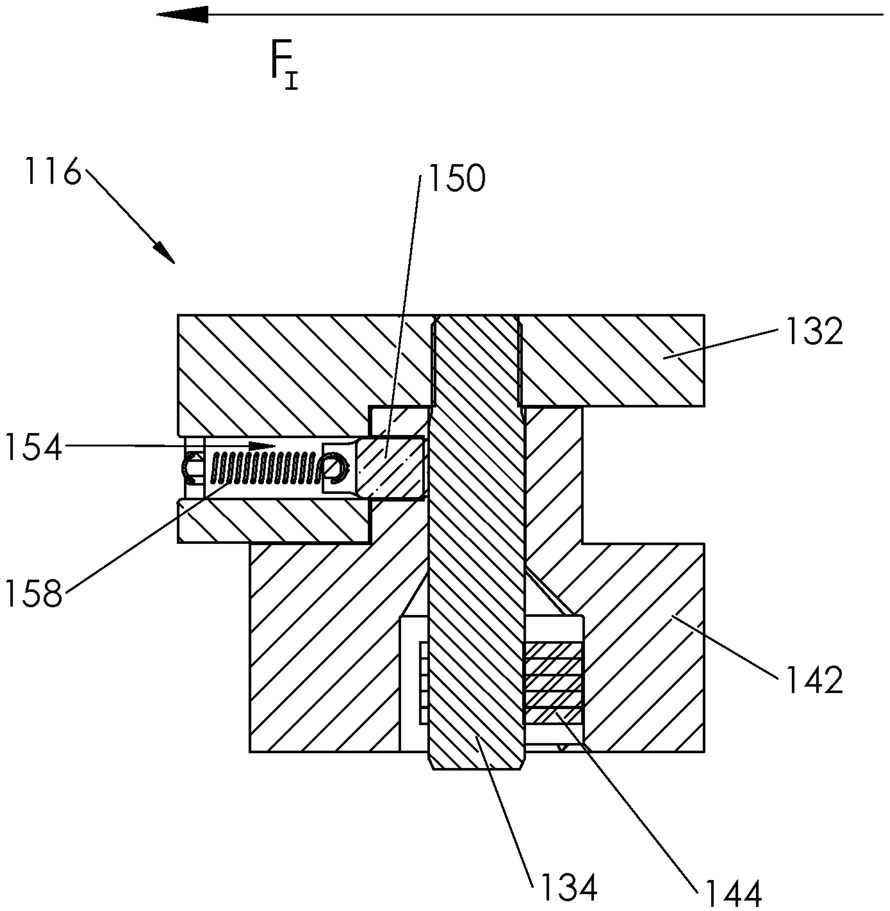

FIGS. 8-10 illustrate an exploded view and sectional views of inertial lock friction hinge 116. In one embodiment, inertial lock friction hinge 116 further includes spring 158 coupled to restraining component 150. In one embodiment, spring 158 is configured in a relaxed state to hold restraining component 150 within shaft assembly recess 154. In this position, inertial lock friction hinge 116 is in the unlocked condition, such that shaft housing 132 and friction housing 142 can be rotated relative to each other by applying a force greater than the friction torque of inertial lock friction hinge 116.

FIG. 10 illustrates inertial lock friction hinge 116 after it has been subjected to an impact force $F_1$ that is large enough to apply a tension load to spring 158, moving it from its relaxed state to a stretched state, thereby allowing restraining component 150 to move out of shaft assembly recess 154. In this way, restraining component 150 extends at least partially into friction assembly recess 152 so that inertial lock friction hinge 116 is in the locked condition, and shaft housing 132 and friction housing 142 are prevented from relative rotation. Accordingly, inertial lock friction hinge 116 can be designed to provide an adjustable amount tension load due to spring 158 so that the amount of impact force $F_1$ required to transition inertial lock friction hinge 116 from unlocked to locked condition is customizable for any particular application.

The orientation of spring 158 can also be adjusted. For example, spring 158, can be configured to hold restraining component 150 within friction assembly recess 152 so that inertial lock friction hinge 116 is in the unlocked condition. Once an impact force $F_1$ is applied sufficient to provide enough tension load to spring 158, restraining component 150 will extend at least partially into shaft assembly recess 154 so that inertial lock friction hinge 116 is in the locked condition, and shaft housing 132 and friction housing 142 are prevented from relative rotation. Other bias mechanisms can also be used for stored energy that need to be overcome with the inertial force to transition inertial lock friction hinge 116 form the unlocked to locked condition. For example, a compression spring, leaf springs, magnets, fluid pressure and similar bias mechanism can be used to hold restraining component 150 in a locked or unlocked position so that the bias mechanism must be overcome in order to change from locked to unlocked or from unlocked to locked.

Also, the orientation of inertial lock friction hinge 116, and thus of spring 158 and restraining component 150, can be adjusted so that spring 158 and restraining component 150 are aligned with an anticipated impact force $F_1$ so that application of the force will cause transition between locked and unlocked conditions.

Figure 11:
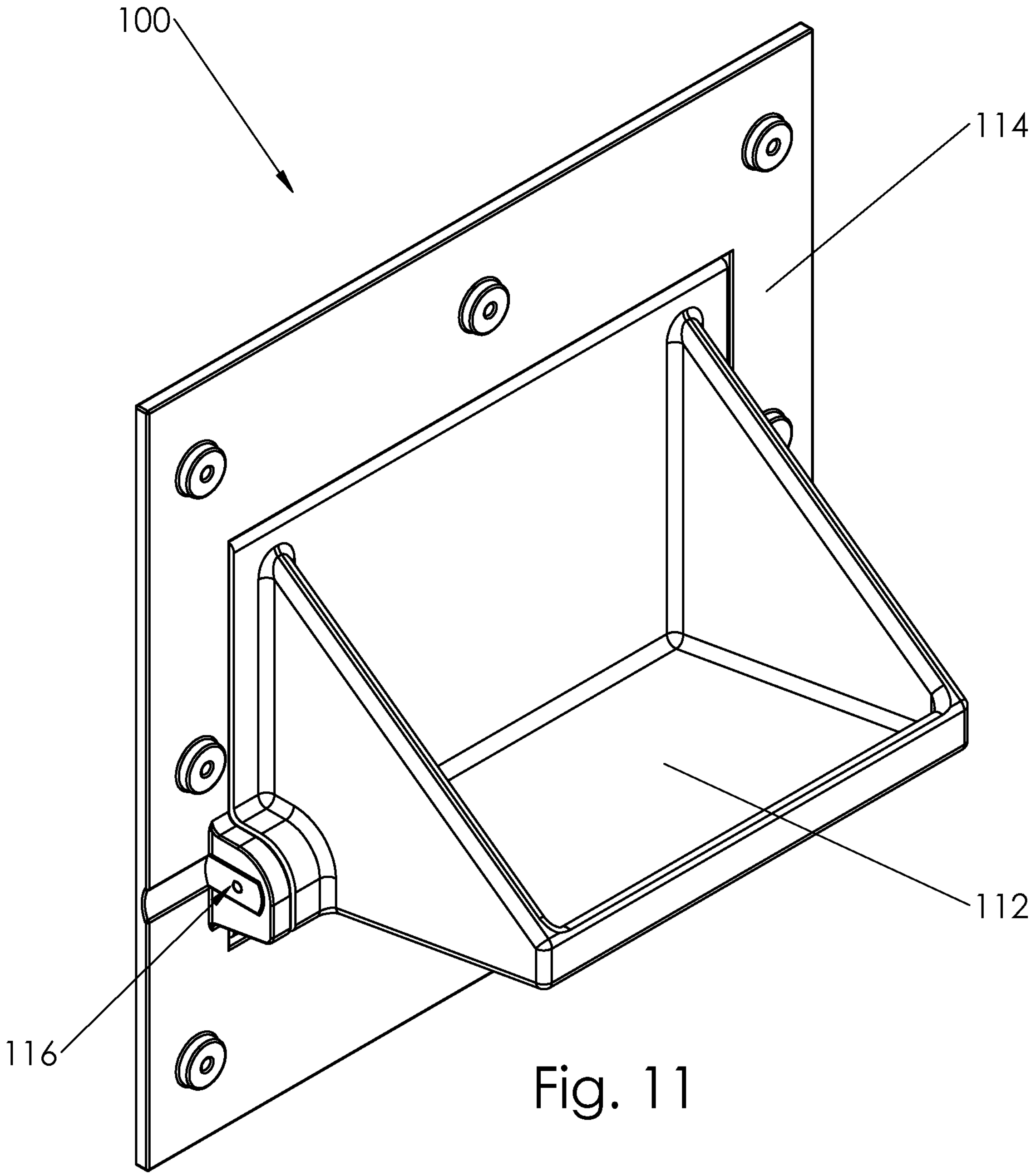
FIG. 11 illustrates a perspective view of a hinged system incorporating an inertial lock friction hinge in accordance with one embodiment.
Figure 12:
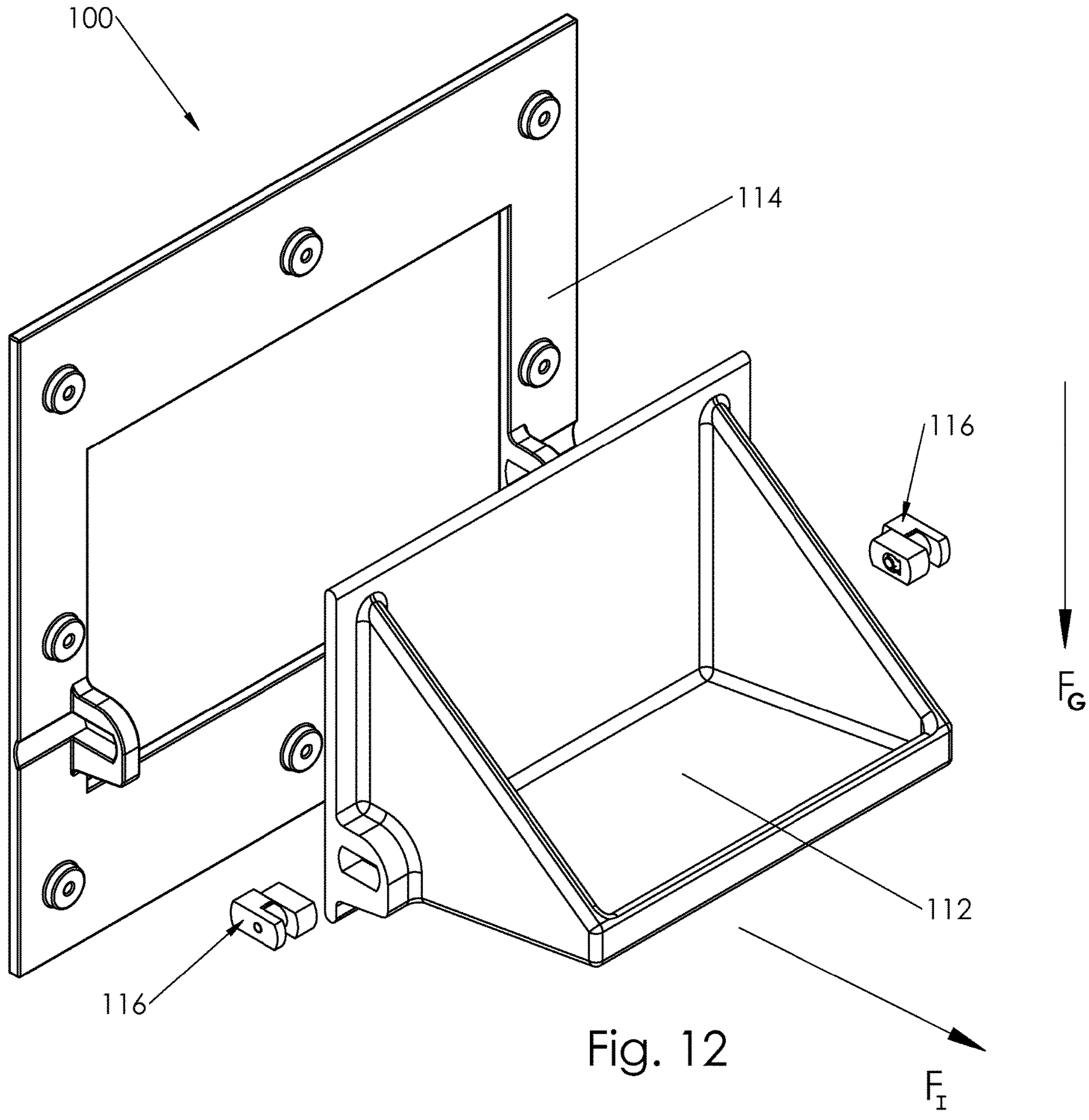
FIG. 12 illustrates a partially exploded view of the hinged system of FIG. 11 incorporating an inertial lock friction hinge in accordance with one embodiment.
Figure 13:
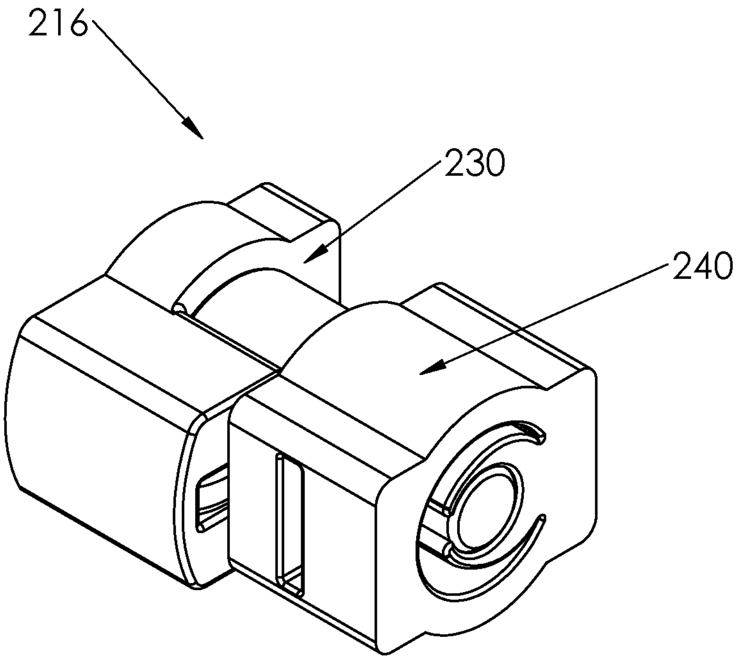
FIG. 13 illustrates a perspective view of a three-part inertial lock friction hinge in accordance with one embodiment.

FIG. 11-12 illustrate an implementation of inertial lock friction hinge 116 within a hinge system 100. In this system, inertial lock friction hinge 116 hinges a moveable door 112 relative to a base 114. In one embodiment, movable door 112 is a glove box in an automobile. Similar to hinge system 10 in FIGS. 1-2, hinge system 100 is oriented with a gravitational force $F_G$ acting down in the direction of arrow $F_G$. In this orientation, stored energy within spring 158 of inertial lock friction hinge 116 maintains inertial lock friction hinge 116 in an unlocked condition, regardless of gravitational force $F_G$. In this way, a user can open and close door 112 relative to base 114 simply by overcoming the frictional force or torque of inertial lock friction hinge 116.

In one embodiment, the orientation of inertial lock friction hinge 116 illustrated in FIG. 10 is used in hinge system 100. Accordingly, when an impact force $F_1$ is applied as shown in FIG. 12 to hinge system 100, restraining component 150 moves out of shaft assembly recess 154 and at least partially into friction assembly recess 152 so that inertial lock friction hinge 116 is in the locked condition, and shaft housing 132 and friction housing 142 are prevented from relative rotation. In this way, the door 112 cannot be opened relative to base 114 regardless of the force applied to door 112 during the impact event.

In such an orientation of inertial lock friction hinge 116, spring 158 may also be used to ensure restraining component 150 remains in shaft assembly recess 154 when inertial lock friction hinge 116 is in the unlocked condition. Because gravitational force $F_G$ is in a direction that perpendicular the orientation of friction assembly recess 152 and shaft assembly recess 154 in hinge system 100 of FIG. 12, gravitational force $F_G$ will not help ensure that restraining component 150 remains in shaft assembly recess 154. Spring 158 can be added for this purpose in one embodiment.

Hinge system 100 of FIGS. 11 and 12 may be required by some safety standards within automobiles in order to prevent objects from escaping bin and becoming flying projectiles. Various other hinged systems may readily implement one or more inertial lock friction hinges 116 to take advantage of its favorable performance characteristics. For example, inertial lock friction hinges 16 or 116 could be used in a hospital cart to prevent contents from flying out of the cart in case it tips over.

FIGS. 13-17 illustrate inertial lock friction hinge 216 in accordance with one embodiment. In one embodiment, inertial lock friction hinge 216 includes shaft assembly 230, friction assembly 240 and restraining component 250. In one embodiment, inertial lock friction hinge 216 includes only these three main components. As described previously, a first hinged element, such as top 12, base 14, door 112 or base 114, is coupled to friction assembly 240 and second hinged element, such as top 12, base 14, door 112 or base 114, is coupled to shaft assembly 230, and the relative movement of restraining component 250 between them causes inertial lock friction hinge 216 to transition between locked and unlocked condition.

In one embodiment, shaft assembly 230 is configured as a single component and friction assembly 240 is configured as a single integrated component. Such a configuration greatly lowers part count, assembly expenses and overall cost. In one embodiment, the three components shaft assembly 230, friction assembly 240 and restraining component 250, are each made using an injection molding process, particularly when they are a plastic material. In another embodiment, each are made using a metal injection molding (MIM) process. Other processes and combinations thereof may also be used to construct shaft assembly 230, friction assembly 240 and restraining component 250 each as single components.

In one embodiment, shaft assembly 230 has a shaft housing portion 232, a shaft portion 234 and a shaft assembly recess 254. In one embodiment, friction assembly 240 includes a friction portion 244, friction housing portion 242, and friction assembly recess 252. Inertial lock friction hinge 216 of FIGS. 13-17 operates similarly to that described above for FIGS. 1-10, except that shaft assembly 230 and friction assembly 240 are each configured as a single component.

In one embodiment, when inertial lock friction hinge 216 is assembled, shaft portion 234 of shaft assembly 230 extends into friction portion 244 of friction assembly 240 with an interference fit. In one embodiment, grease is also added between them. As illustrated, for example in FIGS. 13-14, friction portion 244 is spaced at least partially from friction housing portion 242 such that friction portion 244 can flex slightly as shaft portion 234 is forced into friction portion 244. Accordingly, when shaft assembly 230 and friction assembly 240 are rotated relative to each other, shaft portion 232 rotates within friction portion 244 producing friction torque within inertial lock friction hinge 216.

Figure 15:
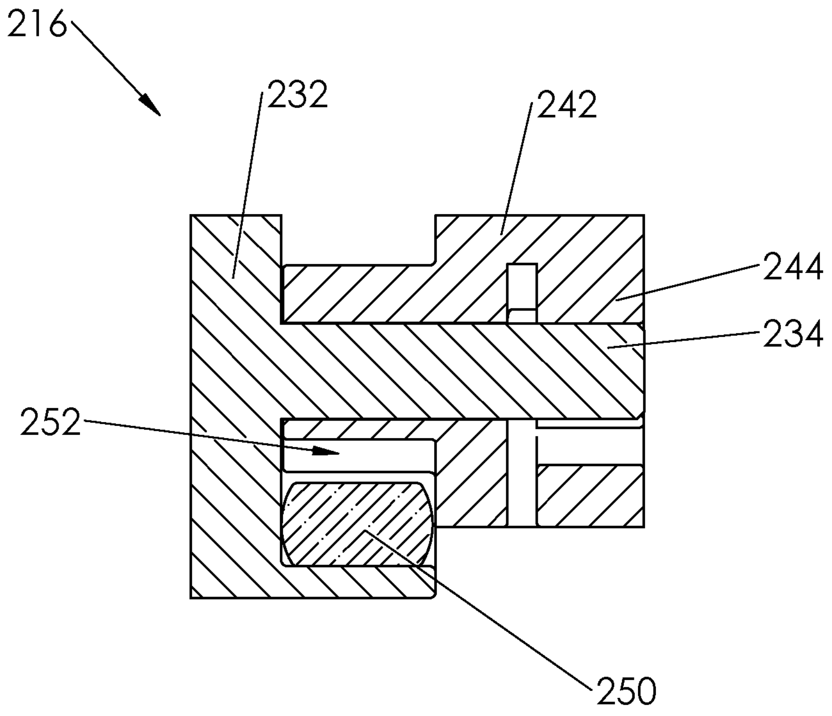
FIGS. 15-17 illustrate cross-sectional views of the inertial lock friction hinge in FIGS. 13-14 in accordance with one embodiment.
Figure 16:
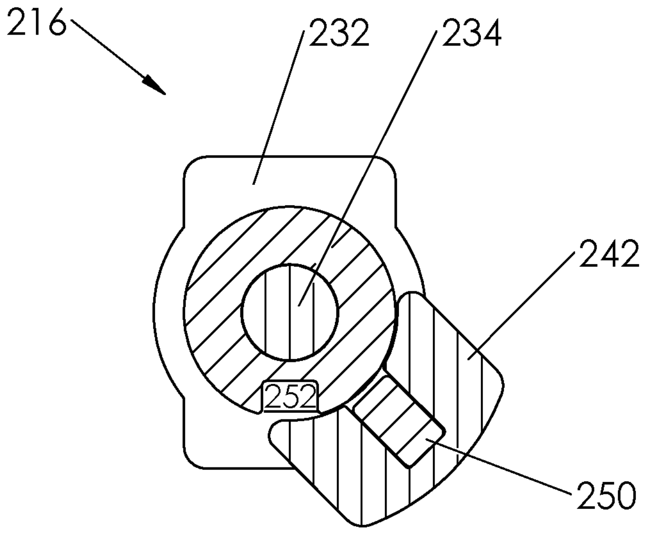

In at least one position of relative orientation of shaft assembly 230 and friction assembly 240, friction assembly recess 252 and shaft assembly recess 254 are aligned, for example, as illustrated in FIG. 15. In one embodiment, restraining component 250 is located fully within shaft assembly recess 254, as illustrated in FIGS. 15 and 16. In this position, inertial lock friction hinge 216 is in an unlocked condition, such that shaft assembly 230 and friction assembly 240 can be rotated relative to each other by applying a force greater than the friction torque of inertial lock friction hinge 216. FIG. 16 illustrates how friction assembly 240 is rotated (counterclockwise as illustrated in the figure) relative to shaft assembly 230 as restraining component 250 remains fully within shaft assembly recess 254.

Figure 17:
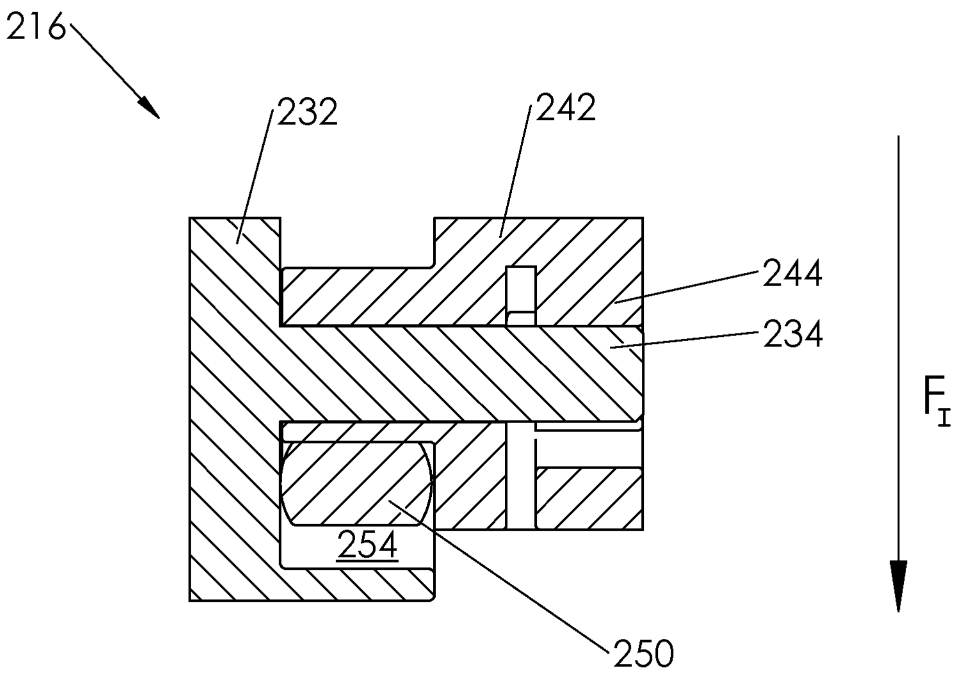
Figure 18:
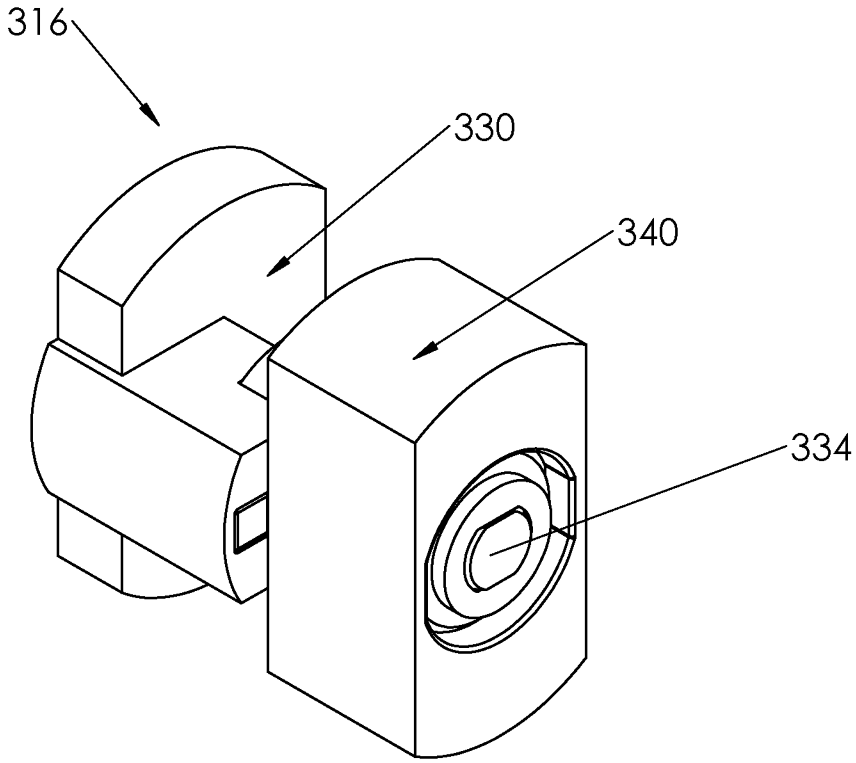
FIG. 18 illustrates a perspective view of an inertial lock friction hinge in accordance with one embodiment.

In one embodiment, subjecting inertial lock friction hinge 216 to an impact force $F_1$ causes inertial lock friction hinge 216 to change from an unlocked condition to a locked condition. For example, when inertial lock friction hinge 216 is subjected impact force $F_1$, as illustrated in FIG. 17, the inertial force on restraining component 250 causes it to shift partially out of shaft assembly recess 254 and at least partially into friction assembly recess 252. Once this occurs, shaft assembly 230 and friction assembly 240 are prevented from significant relative rotation by restraining component 250. When restraining component 250 is oriented partially within shaft assembly recess 254 and partially within friction assembly recess 252, inertial lock friction hinge 216 is in a locked condition.

In the embodiment illustrated in FIGS. 13-17, restraining component 250 is configured as a rectangular blocker. The corresponding shapes of friction assembly recess 252 and shaft assembly recess 254 are then configured to accommodate the shape of restraining component 250. In one embodiment, the surfaces of shaft assembly recess 254 and of friction assembly recess 252, and/or the surfaces of restraining component 250 can be designed with slight angles, which may provide improved engagement in some embodiments.

FIGS. 18-23 illustrate inertial lock friction hinge 316 in accordance with one embodiment. In one embodiment, inertial lock friction hinge 316 includes shaft assembly 330, friction assembly 340 and restraining component 350. Inertial lock friction hinge 316 operates similarly to inertial lock friction hinges 16, 116 and 216 previously described.

In one embodiment, shaft assembly 330 includes shaft housing 332 and shaft 334. In one embodiment, shaft housing 332 further includes shaft assembly recess 354. In one embodiment, friction assembly 340 includes a plurality of friction elements 344 and friction housing 342. In one embodiment, friction housing 342 includes friction assembly recess 352.

In one embodiment, when inertial lock friction hinge 316 is assembled, shaft 334 is firmly attached within an opening in shaft housing 332 such that they are fixed together. As such, shaft 334 and shaft housing 332 rotate together. Friction elements 344 are placed over shaft 334 and are also contained within friction housing 342, along with optional grease. In one embodiment, friction elements 344 include fixed plate members 344*a*, friction disc members 344*b*, Belleville disc spring 344*c* and retaining ring 344*d*. In one embodiment, fixed plate members 344*a* are clocked to housing 342, friction disc members 344*b* are clocked to shaft 334, and retaining ring 344*d* is press fit to shaft 334 with a compressive force that holds all the members together axially. Belleville disc spring 344*c* provides a compressive force against friction disc members 344*b*. Accordingly, when shaft housing 332 rotates relative to friction housing 342, the compression force between fixed plate members 344*a* and friction disc members 344*b* during their relative rotation produces friction torque within inertial lock friction hinge 316. The amount of friction torque within inertial lock friction hinge 316 can be readily adjusted up or down by adjusting the compression of Belleville disc spring 344*c* or by adding or subtracting the number of fixed plate members 344*a* and friction disc members 344*b*. Other means of creating friction torque with relative rotation of shaft housing 332 and friction housing 342 are also possible.

Figure 22:
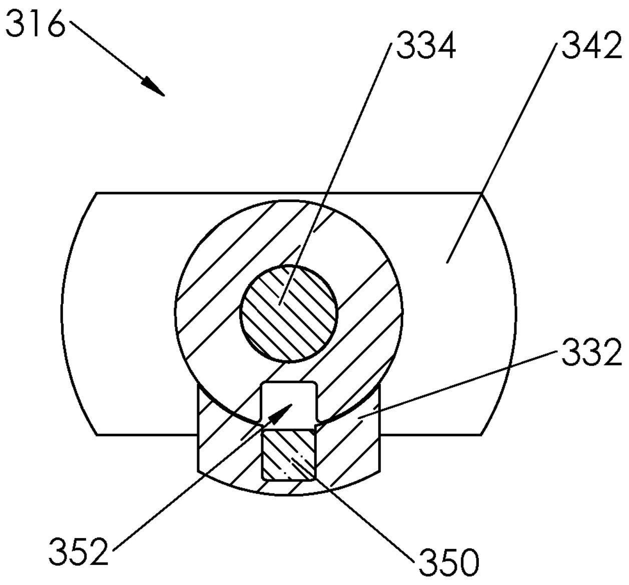
Figure 23:
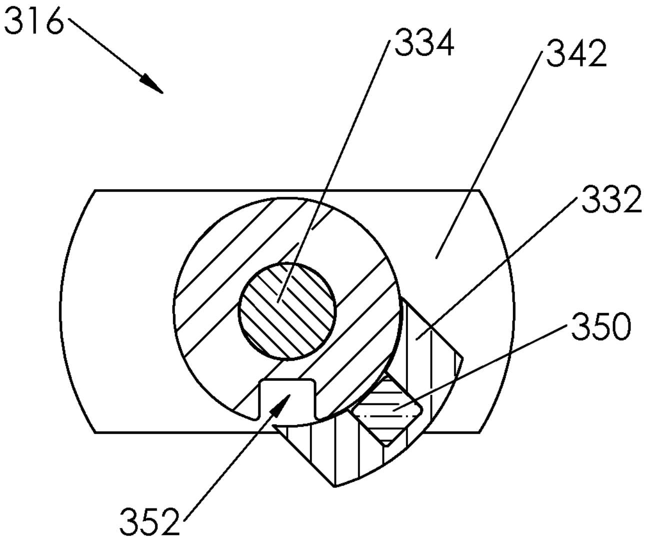
Figure 24:
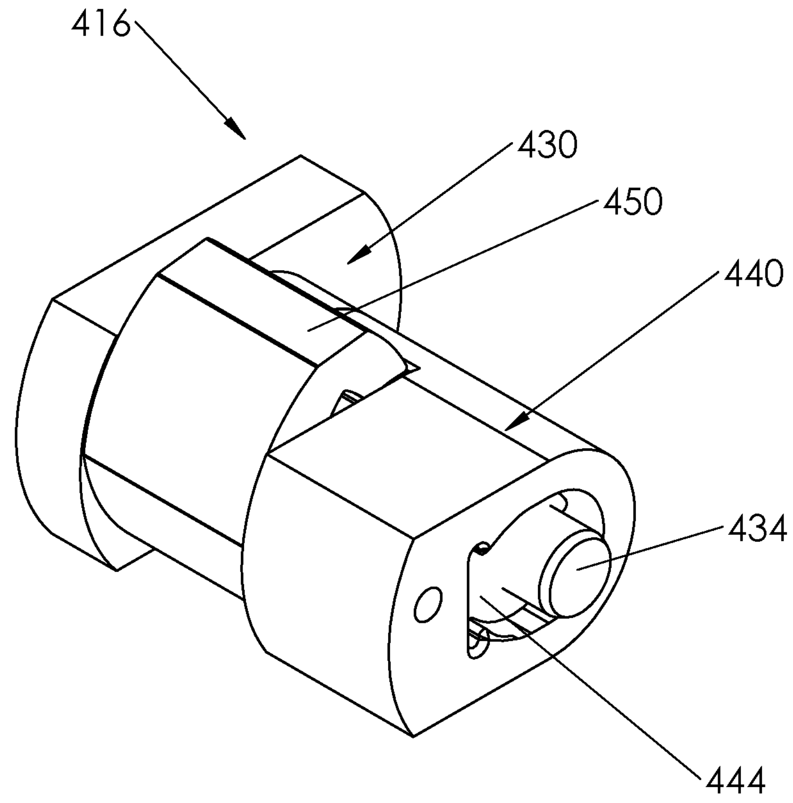
FIG. 24 illustrates a perspective view of an inertial lock friction hinge in accordance with one embodiment.
Figure 25:
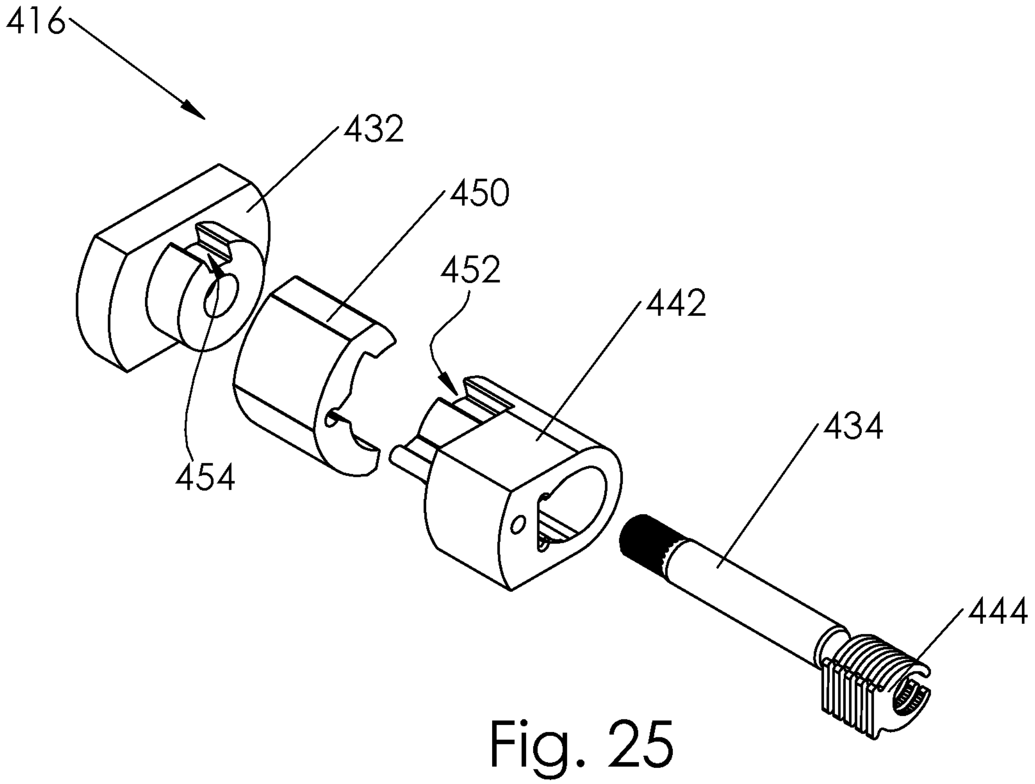
FIG. 25 illustrates an exploded view of the inertial lock friction hinge in FIG. 24 in accordance with one embodiment.

Also similar to inertial lock friction hinges 16, 116 and 216 above, in at least one position of relative orientation of shaft housing 332 and friction housing 342 for inertial lock friction hinge 316, friction assembly recess 352 and shaft assembly recess 354 are aligned, for example, as illustrated in FIG. 22. In one embodiment, restraining component 350 is located fully within shaft assembly recess 354, also as illustrated in FIG. 22. In this position, inertial lock friction hinge 316 is in an unlocked condition, such that shaft assembly 330, including shaft housing 332, and friction assembly 340, including friction housing 342, can be rotated relative to each other by applying a force greater than the friction torque of inertial lock friction hinge 316. FIG. 23 illustrates how shaft housing 332 is rotated (counterclockwise as illustrated in the figure) relative to friction housing 342 as restraining component 350 remains fully within shaft assembly recess 354.

Figure 21:
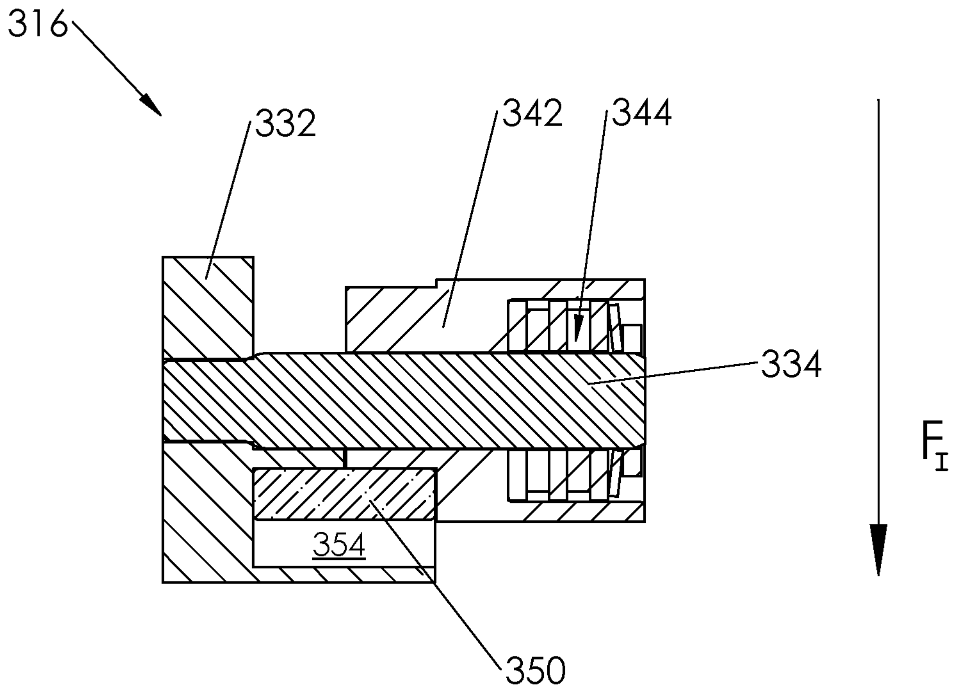

In one embodiment, subjecting inertial lock friction hinge 316 to an outside impact force $F_1$ causes inertial lock friction hinge 316 to change from an unlocked condition to a locked condition. For example, when inertial lock friction hinge 316 is subjected to an impact force $F_1$ this causes restraining component 350 to shift partially out of shaft assembly recess 354 due to its inertial force and at least partially into friction assembly recess 352, as illustrated in FIG. 21. Once this occurs, shaft housing 332 and friction housing 342 are prevented from significant relative rotation by the engagement by each of restraining component 350. When restraining component 350 is oriented partially within shaft assembly recess 354 and partially within friction assembly recess 352, inertial lock friction hinge 316 is in a locked condition.

When inertial lock friction hinge 316 is installed in a console, such as in FIG. 1, the cover 12 is then locked closed against base 14 and will retain any contents within base 14. When inertial lock friction hinge 316 is installed in a glove compartment, such as in FIG. 11, the door 112 is then locked closed against base 114 and will retain any contents therein. In one embodiment, when inertial lock friction hinge 316 is installed in a glove compartment, depending on orientation, it may also include a spring, such as spring 158 in FIG. 10, coupled to restraining component 350.

Figure 4:
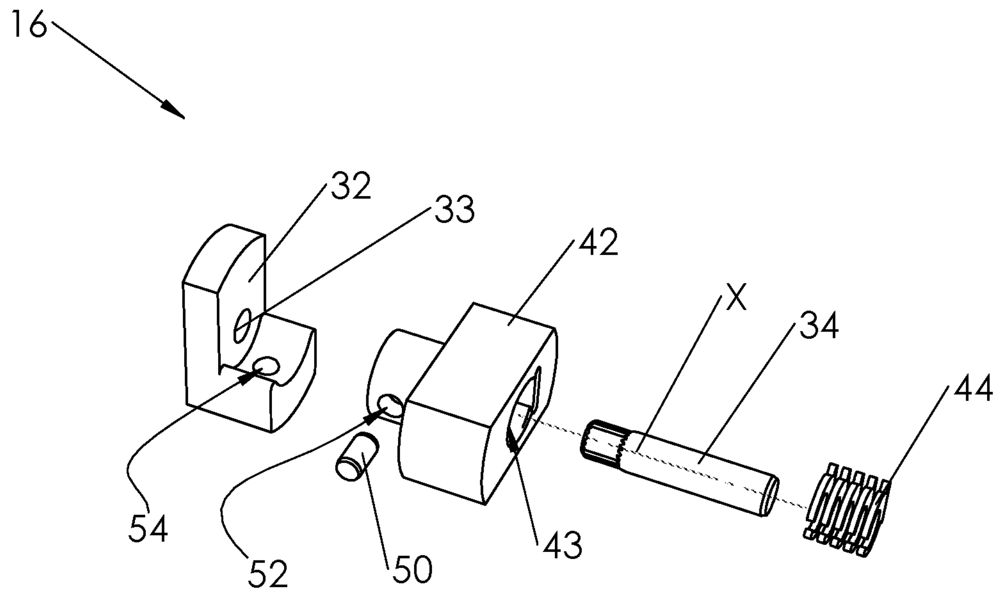
FIG. 4 illustrates an exploded view of the inertial lock friction hinge in FIG. 3 in accordance with one embodiment.
Figure 14:
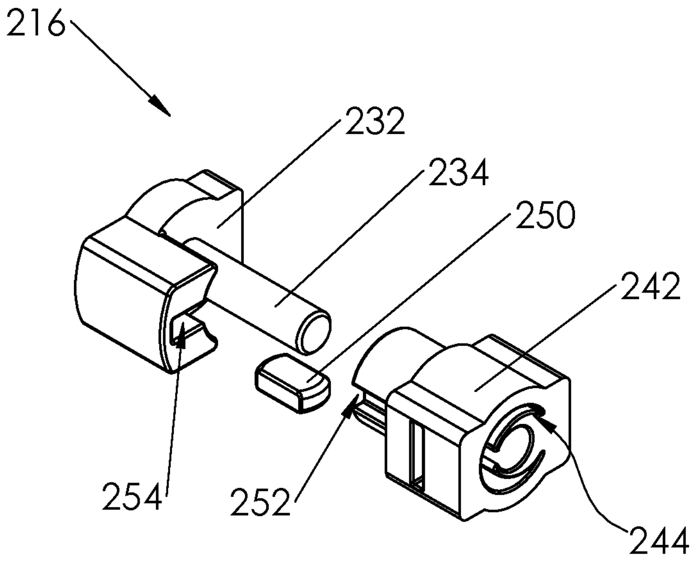
FIG. 14 illustrates an exploded view of the three-part inertial lock friction hinge of FIG. 13 in accordance with one embodiment.
Figure 19:
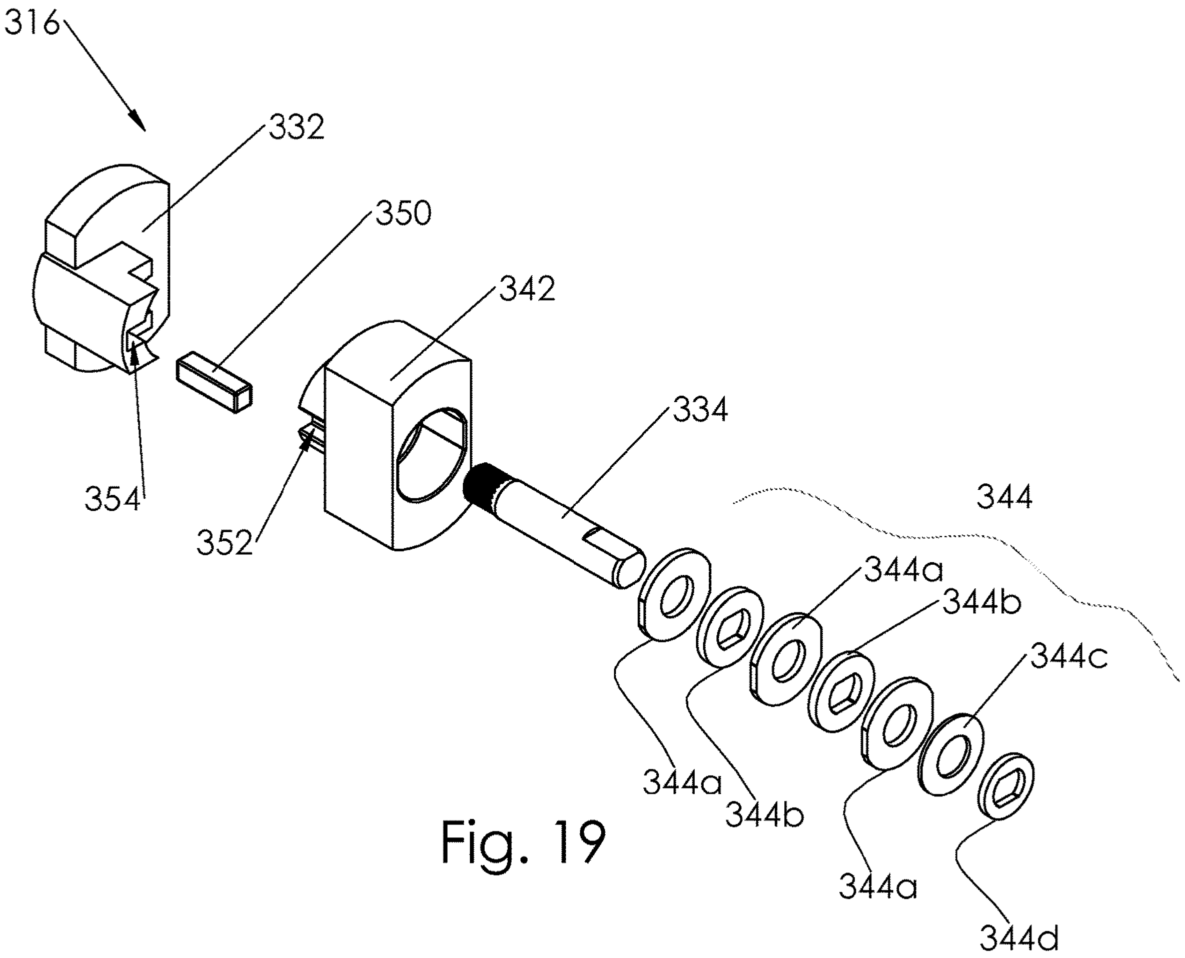
FIG. 19 illustrates an exploded view of the inertial lock friction hinge in FIG. 18 in accordance with one embodiment.
Figure 20:
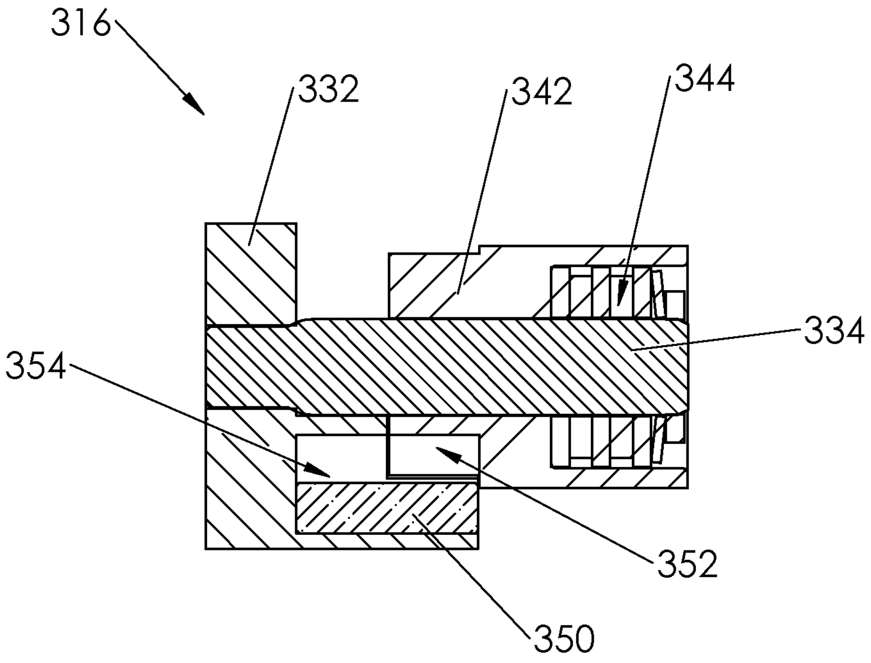
FIGS. 20-23 illustrate cross-sectional views of the inertial lock friction hinge in FIGS. 18-19 in accordance with one embodiment.

As illustrated in FIG. 19, restraining component 350 is a generally rectangular block, while restraining component 50 in FIG. 4 is pin or cylindrically shaped and restraining component 250 in FIG. 14 is yet another rectangular shape. Accordingly, many different shapes can be used for a restraining component, with shaft and friction assembly recesses shaped in a complementary form to accommodate the restraining component. The various types of restraining components, friction elements and bias mechanisms in the embodiments can be variously combined within an inertial lock friction hinge.

FIGS. 24-28 illustrate inertial lock friction hinge 416 in accordance with one embodiment. In one embodiment, inertial lock friction hinge 416 includes shaft assembly 430, friction assembly 440, and restraining component 450. In one embodiment, shaft assembly 430 includes shaft housing 432, shaft 434, and shaft housing recess 454. In one embodiment, friction assembly 440 includes a plurality of friction elements 444, friction housing 442, and friction housing recess 452. Inertial lock friction hinge 416 operates similarly to inertial lock friction hinges 16, 116, 216 and 316 previously described.

In one embodiment, when inertial lock friction hinge 416 is assembled, shaft 434 is firmly attached within an opening in shaft housing 432 such that they are fixed together and shaft 434 and shaft housing 432 rotate together. Friction elements 444 are placed over shaft 434 in an interference fit and are also contained within friction housing 442, such that friction elements 444 are prevented from relative rotation with friction housing 442. Accordingly, when shaft housing 432 rotates relative to friction housing 442, shaft 434 rotates within friction elements 444 producing friction torque within inertial lock friction hinge 416.

Figure 26:
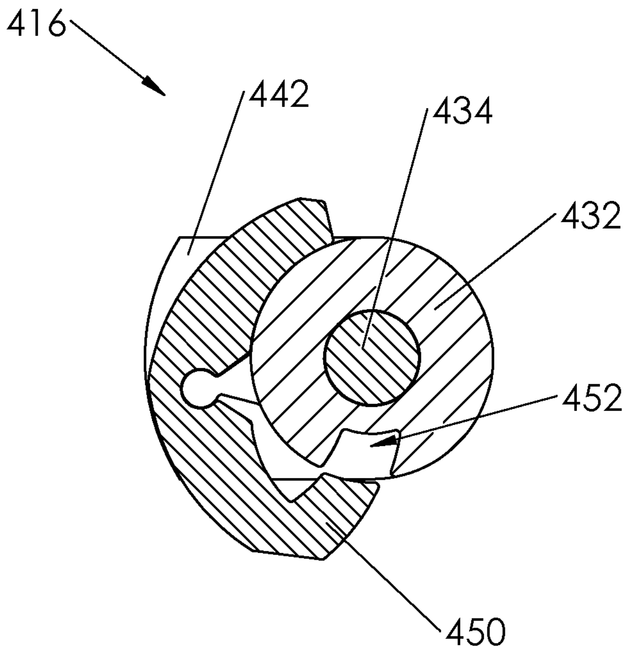
FIGS. 26-28 illustrate cross-sectional views of the inertial lock friction hinge in FIGS. 24-25 in accordance with one embodiment.
Figure 27:
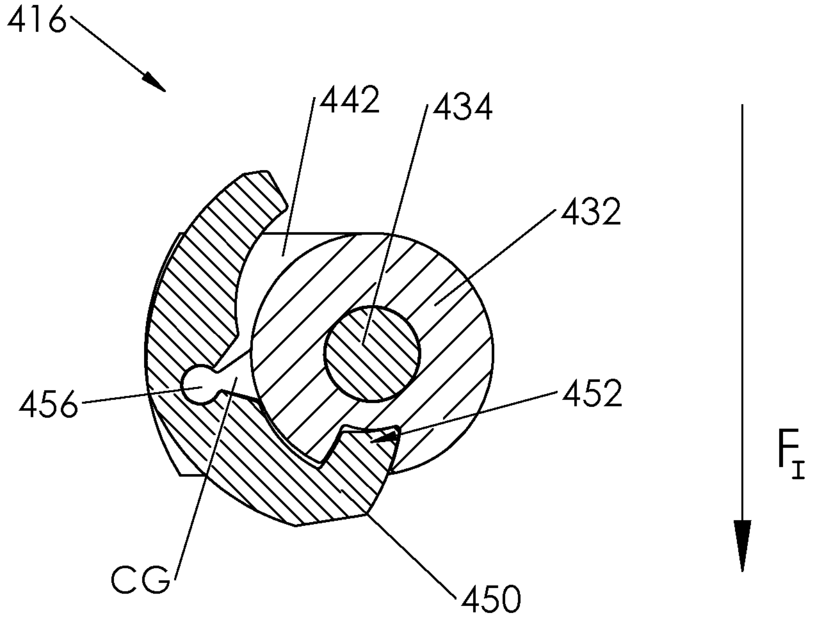
Figure 28:
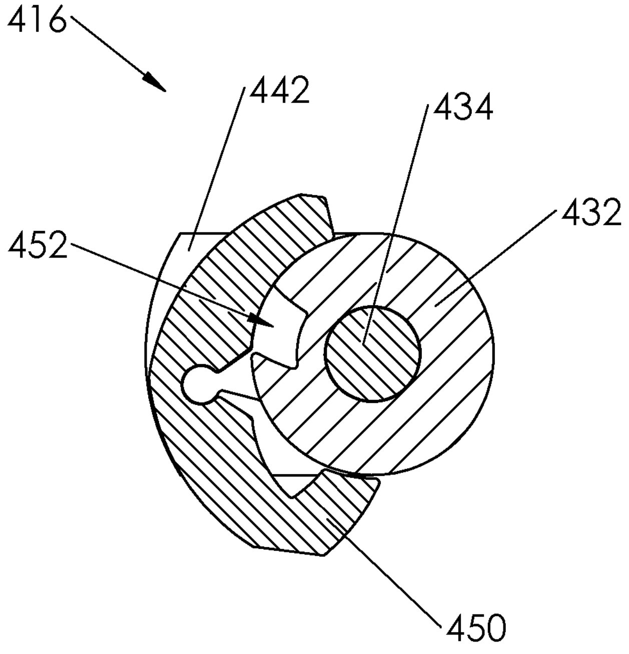

In one embodiment, restraining component 450 is a configured as pawl blocker. When inertial lock friction hinge 416 is in an unlocked condition, restraining component 450 or pawl rests on a pivot axis 456 (see, FIG. 27) and does not engage friction housing recess 452 or shaft housing recess 454. As shown in FIGS. 26 and 28, restraining component 450 rotates with shaft housing 432 and gravitational forces hold restraining component 450 in a disengaged position from friction housing recess 452. When restraining component 450 is a pawl as illustrated, its geometry is such that its center of gravity CG (see, FIG. 27) is off pivot axis 456 and in a location that holds it in a disengaged state under normal gravitational forces. Like the previously described embodiments, friction torque from the friction portion of the embodiment is all that resists movement between shaft housing 432 and friction housing 442 during normal operation.

When an outside impact force $F_1$ in the same direction of normal gravitational force exceed those set during the design, restraining component 450 rotates into a position engaging shaft housing recess 454, thereby preventing relative rotation between shaft housing 432 and friction housing 442 and placing inertial lock friction hinge 416 in this locked condition. Friction housing recess 452 and shaft housing recess 454 as well as the pawl features of restraining component 450 are designed with locking angles to prevent disengagement under load during the locked condition. When inertial forces dissipate, the pawl returns to a disengaged position due to gravitational forces such that inertial lock friction hinge 416 returns to the unlocked condition.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An inertial lock friction hinge system comprising:

a first hinged element;

a second hinged element;

a shaft assembly coupled to the first hinged element, the shaft assembly having a shaft assembly recess and a shaft;

a friction assembly coupled to the second hinged element, the friction assembly having a friction assembly recess;

wherein the shaft assembly and the friction assembly are rotatably coupled for relative frictional rotation about the shaft;

a restraining component positioned within the inertial lock friction hinge system such that when the restraining component is fully contained within one of the friction assembly recess and the shaft assembly recess the shaft assembly and the friction assembly are allowed to rotate relative to each other under friction such that the inertial lock friction hinge system is in an unlocked condition, and the restraining component positioned such that when the restraining component is at least partially within both of the friction assembly recess and the shaft assembly recess the shaft assembly and the friction assembly are prevented from relative rotation such that the inertial lock friction hinge system is in a locked condition, wherein the restraining component moves radially relative to the shaft.

2. The inertial lock friction hinge system of claim 1, wherein the inertial lock friction hinge system is configured to be in the unlocked condition when gravitational force acts upon the inertial lock friction hinge system and configured to be in the locked condition when an external impact force acts upon the inertial lock friction hinge system.

3. The inertial lock friction hinge system of claim 1, wherein the inertial lock friction hinge system is configured such that gravitational force acting on the inertial lock friction hinge system causes the restraining component to be fully contained within one of the friction assembly recess and the shaft assembly recess so that the inertial lock friction hinge system is in the unlocked condition.

4. The inertial lock friction hinge system of claim 1, wherein the inertial lock friction hinge system is configured such that an external impact force acting on the inertial lock friction hinge system causes the restraining component to be partially contained within each of the friction assembly recess and the shaft assembly recess so that the inertial lock friction hinge system is in the locked condition.

5. The inertial lock friction hinge system of claim 1, wherein the shaft assembly comprises a shaft housing and the shaft and the friction assembly comprises a friction housing containing at least one friction element, and wherein the at least one friction element is configured over the shaft in an interference fit.

6. The inertial lock friction hinge system of claim 5, wherein the shaft rotates along a shaft axis and wherein when the inertial lock friction hinge system changes between the locked condition and the unlocked condition the restraining component moves radially relative to the shaft.

7. The inertial lock friction hinge system of claim 1, wherein the restraining component is one of a pin and a rectangular block.

8. The inertial lock friction hinge system of claim 1, wherein the restraining component further comprises a bias mechanism configured to hold the restraining component in one of the friction assembly recess and the shaft assembly recess until an impact force causes a load on the bias mechanism thereby moving the restraining component at least partially into both of the friction assembly recess and the shaft assembly recess.

9. An inertial lock friction hinge comprising:

a shaft assembly having a shaft assembly recess and a shaft;

a friction assembly having a friction assembly recess;

wherein the shaft assembly and the friction assembly are rotatably coupled for relative frictional rotation about the shaft;

a restraining component positioned within the inertial lock friction hinge such that when the inertial lock friction hinge is in an unlocked condition the restraining component is not engaged with both the friction assembly recess and the shaft assembly recess so that the shaft assembly and the friction assembly are allowed to rotate relative to each other under friction, and the restraining component positioned such that when the inertial lock friction hinge is in a locked condition the restraining component is at least partially engaged with both the friction assembly recess and the shaft assembly recess so that the shaft assembly and the friction assembly are locked and prevented from relative rotation by the restraining component, wherein the restraining component moves radially relative to the shaft.

10. The inertial lock friction hinge of claim 9, wherein the inertial lock friction hinge is configured to be in the unlocked condition when gravitational force acts upon the inertial lock friction hinge and configured to be in the locked condition when an external impact force act upon the inertial lock friction hinge.

11. The inertial lock friction hinge of claim 9, wherein the inertial lock friction hinge is configured such that an external impact force acting on the inertial lock friction hinge causes the restraining component to be partially engaged with each of the friction assembly recess and the shaft assembly recess so that the inertial lock friction hinge is in the locked condition.

12. The inertial lock friction hinge of claim 9, wherein the shaft assembly comprises a shaft housing and the shaft and the friction assembly comprises a friction housing containing at least one friction element, and wherein the at least one friction element is configured over the shaft in an interference fit.

13. The inertial lock friction hinge of claim 12, wherein the shaft rotates along a shaft axis and wherein when the inertial lock friction hinge changes between the locked condition and the unlocked condition the restraining component moves radially relative to the shaft.

14. The inertial lock friction hinge of claim 13, wherein the restraining component transitions radially toward the shaft with application of impact force to the inertial lock friction hinge.

15. The inertial lock friction hinge of claim 9, wherein the restraining component is one of a pin, a rectangular block and a pawl.

16. An inertial lock friction hinge comprising:

a shaft assembly having a shaft assembly recess and a shaft;

a friction assembly having a friction assembly recess;

wherein the shaft assembly and the friction assembly are rotatably coupled for relative frictional rotation about the shaft;

a restraining component positioned within the inertial lock friction hinge such that when the inertial lock friction hinge is in an unlocked condition the restraining component is fully contained within one of the friction assembly recess and the shaft assembly recess so that the shaft assembly and the friction assembly are allowed to rotate relative to each other under friction, and the restraining component positioned such that when the inertial lock friction hinge is in a locked condition the restraining component is at least partially contained within both the friction assembly recess and the shaft assembly recess so that the shaft assembly and the friction assembly are locked and prevented from relative rotation by the restraining component, wherein the restraining component moves radially relative to the shaft.

17. The inertial lock friction hinge of claim 16, wherein the inertial lock friction hinge is configured to either change from the locked condition to the unlocked condition or change from the unlocked condition to the locked condition when an external impact force acts upon the inertial lock friction hinge.

18. The inertial lock friction hinge of claim 17, wherein the external impact force on the inertial lock friction hinge either causes the restraining component to be fully contained within one of the friction assembly recess and the shaft assembly recess so that the inertial lock friction hinge is in the unlocked condition or causes the restraining component to be partially contained within each of the friction assembly recess and the shaft assembly recess so that the inertial lock friction hinge is in the locked condition.

19. The inertial lock friction hinge of claim 16, wherein the shaft assembly comprises a shaft housing and the shaft and the friction assembly comprises a friction housing containing at least one friction element, wherein the at least one friction element is configured over the shaft in an interference fit, and wherein the shaft rotates along a shaft axis and wherein when the inertial lock friction hinge changes between the locked condition and the unlocked condition the restraining component moves radially relative to the shaft.

20. The inertial lock friction hinge of claim 16, wherein the shaft assembly, the friction assembly, and the restraining component are each single integrated components.

* * * * *